July 9, 1957 H. H. SCHAUMANN 2,798,819
PROCESS FOR THE MANUFACTURE OF TITANIUM DIOXIDE PIGMENT
Filed April 16, 1953
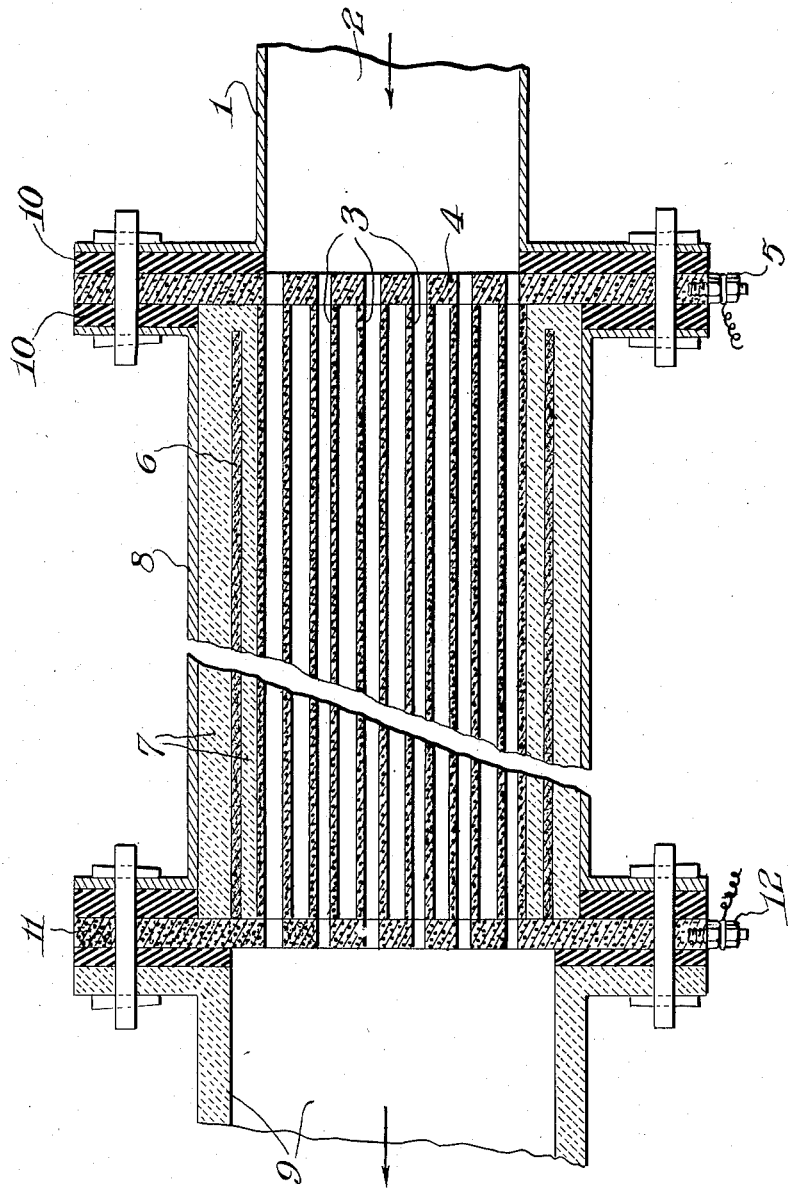
INVENTOR
HOLGER H. SCHAUMANN
BY
ATTORNEY

United States Patent Office 2,798,819
Patented July 9, 1957

2,798,819
PROCESS FOR THE MANUFACTURE OF TITANIUM DIOXIDE PIGMENT

Holger H. Schaumann, Newark, Del., assignor to E. I. du Pont de Nemours and Company, Wilmington, Del., a corporation of Delaware Application April 16, 1953, Serial No. 349,213

1 Claim. (Cl. 106—300)

This invention relates to novel methods for heating corrosive gases and more particularly to the heating of halogen-containing gases, such as titanium tetrachloride vapor for the production of a titanium dioxide pigment.

In the vapor phase oxidation of titanium tetrachloride with an oxygen-containing gas, such as air, separate preheating of the reactants, prior to introduction into a reaction zone, is highly desirable. Titanium tetrachloride is highly corrosive toward metals, especially at elevated temperatures, and in such heating recourse must be had to corrosion-resistant heat-exchange equipment through the walls of which the necessary heat is supplied. Such equipment is constructed chiefly of refractory materials, but most refractory materials are attacked to some extent by hot titanium chloride vapors and therefore become unsuitable for use in such applications, due either to actual destruction of the refractory itself or because of the leaching out of impurities from the refractories by the titanium tetrachloride. These impurities disadvantageously cause subsequent contamination of the final reaction products from the TiCl₄. Fused silica, though satisfactorily useful from the standpoint of corrosion resistance, is very fragile and is subject to progressive deterioration at elevated temperatures (devitrification). Moreover, these refractory heat exchangers are relatively inefficient, because of their inherent insulating properties and the difficulty of fabricating the complex and delicate shapes which commercial usage requires. In addition, and due to such silica devitrification, product gas temperatures above 1000° C. are not commercially practicable.

The heating of titanium tetrachloride by directly mixing hot combustion gases with the chloride, as contemplated in U. S. Patent 2,512,341, avoids some of the difficulties in the construction of the heater, but, undesirably, dilution of the reacting gas streams occurs, particularly the product gases from the oxidation. This often results in requiring the use of subsequent processing equipment of increased size. Also, the combustion gases must, for economic reasons, be substantially dry and free from hydrogen. These considerations present serious handicaps to the use of this type of process in heating titanium tetrachloride vapor.

Similar problems arise in the heating without impurity introduction of other corrosive gases to high temperature. Many vapor phase chemical processes in which high purity products are desired, require an uncontaminated halogen-containing reactant gas, or a mixture of halogen-containing reactant gases, at relatively high temperatures, say, from 300° C. to 2000° C., prior to introduction into the reaction zone. For example, pure anhydrous silicon tetrachloride vapor may be required for reduction by a more active metal to pure metallic silicon, or for oxidation by a vapor phase process to produce SiO₂ or SiO of very high purity. Furthermore, halogenation reactions may require anhydrous HCl or other hydrogen halide gas of high purity, at temperatures of 1000° C. or more, at which temperatures normal processes of heating HCl would be unsatisfactory because of impurities introduced into the gas due to corrosion or because of high cost of equipment maintenance due to corrosiveness of the vapor or fragility of equipment. Also, the corrosiveness of anhydrous free halogens and of halides at high temperatures is well known, and processes for heating them above 500–1000° C. are costly and purity of the heated gas is sacrificed.

It is among the objects of this invention to provide novel and useful methods for heating an anhydrous halogen-containing vapor while maintaining the heated vapor in an uncontaminated state. A further object is to provide a novel process of heating an anhydrous halogen-containing vapor selected from the group consisting of free halogens of atomic number greater than nine, halides of hydrogen, and halides of metals and metalloid elements and mixtures thereof, from their vaporization temperature or dew point up to as high as 2000° C. in uncontaminated state. A still further object is to provide a process for heating vaporized, anhydrous group IV metal halides, including halides of silicon, to said temperatures and while maintaining the vaporized group IV metal halide in an uncontaminated condition. A specific object is to provide a novel process for heating in uncontaminated state vaporized anhydrous titanium tetrachloride, either alone or in admixture with other vaporized halogens and halides and to temperatures within a range of from 136° C.–2000° C. Other objects and advantages of the invention will be apparent from the ensuing description.

These and other objects are accomplished in this invention which comprises heating a vaporized halogen-containing reactant in which the halogen present has an atomic number greater than 9, to temperatures from above the vaporization point of said halogen to about 2000° C. to obtain an uncontaminated reactant, by conterminously charging the reactant in vaporous, anhydrous state through an enclosed heating zone and in direct contact with an electrically heated resistor element composed of relatively dense, elemental allotropic carbon selected from the group consisting of amorphous carbon, graphite, and mixtures thereof.

More specifically the invention comprises heating a chlorine-containing product in gaseous state up to about 2000° C. to obtain an uncontaminated chlorine-containing reactant by charging in vaporous, anhydrous condition a chlorine-containing product selected from the group consisting of chlorine, hydrogen chloride, a metal chloride, a metalloid chloride, and mixtures thereof, conterminously through and in direct contact with a plurality of electrically heated resistor elements disposed within a heating conduit or zone, said elements being composed of relatively dense, elemental carbon in allotropic form selected from the group consisting of amorphous carbon, graphite, and mixtures thereof.

In a more specific and preferred embodiment, the invention comprises, as a step in the vapor phase oxidation of anhydrous titanium tetrachloride and mixtures thereof with vaporized anhydrous metal chlorides and anhydrous chlorine to produce titanium dioxide of superior pigment quality, the passage of said vaporized titanium tetrachloride-containing vapor for heating in uncontaminated state to temperatures ranging from in excess of 136° C. to 2000° C. over or through a plurality of electrically heated resistor units composed of elemental carbon selected from allotropic forms of carbon, amorphous carbon, graphite, and mixtures thereof.

Combinations of halide vapors particularly adaptable for treatment in accordance with the invention and for the production of titanium dioxide pigments include the following, together with certain optimum utilizable heating and temperature ranges for the various allotropic forms of carbon employable therewith:

TABLE

| Vapor Constituents | Form of Carbon | Temperature Limitations | |
| --- | --- | --- | --- |
| | | Minimum, °C. | Maximum, °C. |
| TiCl₄ | Amorphous | 136 | 950 |
| TiCl₄ | Graphite | 136 | 2,000 |
| TiCl₄+AlCl₃ | Amorphous | 136 | 950 |
| TiCl₄+AlCl₃ | Graphite | 136 | 2,000 |
| TiCl₄+AlCl₃+Cl₂ | Amorphous | 136 | 950 |
| TiCl₄+AlCl₃+Cl₂ | Graphite | 350 | 2,000 |

Referring to the accompanying drawing, there is shown a diagrammatic illustration of one form of suitable apparatus for carrying out the invention. In one practical adaptation involving the heating of titanium tetrachloride, the latter in vaporous, anhydrous state can be charged from a source of supply (not shown) into an elongated or other suitable form of closed, corrosion-resistant metal or refractory conduit 1 provided with an inlet 2 leading into a bank of electrically heated graphite resistor tube elements 3 which are arranged as shown in parallel to the direction of flow of the TiCl₄ vapor. The resistor elements are set into a circular flange type graphite tube sheet or header 4 which also serves as the electric power intake through a terminal 5 which communicates with a source of current supply (also not shown) and serves as the power distributor to the multiple tubes 3. The resistor heating elements 3 are suitably enclosed within a graphite shell 6 which in turn is surrounded by refractory insulation 7 and the entire resistor assembly is enclosed within a tubular metal shell 8 and is adapted to be interposed between and suitably connected to the inlet conduit 1 and the exit conduit 9 so as to form a continuous passage for the vapor being subjected to heating. The inlet graphite electrical distributor header 4 is electrically insulated from the inlet vapor conduit 1 and the metal shell 8 by means of suitable insulation gaskets 10.

In operation the resistor is electrically energized to form a heating unit adapted to be maintained at any desired temperature by flowing an electrical current through a feed wire (not shown) to terminal 5 into the inlet graphite distributor tube header 4, through the walls of the individual graphite resistor tubes 3 which comprise the major resistance to the circuit, to the outlet graphite tube sheet or header 11 and thence through current outlet binding post 12 and thence to the current source (not shown) to complete the circuit. The titanium tetrachloride vapor entering the thus-heated resistor tubes flows from the conduit inlet 2 conterminously through the electrically heated tubes 3 and after passage therethrough discharges as uncontaminated, highly heated titanium tetrachloride vapor into the refractory exit conduit 9 which communicates with a source of use therefor, such as an oxidation or co-oxidation reactor unit for producing high-grade titanium oxide pigments and in accordance with the methods described in U. S. Patents No. 2,488,439 or 2,559,638. The porosity of the graphite resistor tubes and shell necessitates the use of the metal outer shell 8 which provides a stagnant volume of titanium tetrachloride commingled with the powdered insulating material, such as, for example, powdered SiO₂, so that the temperature of the entire unit (including the metal shell 8) is maintained above 136° C. to avoid liquid condensation. Customary thermal insulation outside the metal shell can be resorted to, depending on the desired relationship between the inside gas temperature and the outside air temperature, so that liquid condensation will be eliminated. In heating the more complex gas mixtures, such as referred to above in the tabulation, one heater of the type described can be used to effect vapor heating in the lower temperature range, while a second and similar heater can be used, if desired, to attain a final and higher desired temperature.

To a clearer understanding of the invention, the following specific examples are given. These are merely illustrative but not in limitation of the invention.

Example I

Liquid titanium tetrachloride substantially free of oxygen was volatilized at a rate of 120 lbs. per hour under a pressure of 10 p. s. i. g. using steam, within heat transfer coils at 150 p. s. i. g. The resulting titanium tetrachloride vapor was then fed into and through an electrically heated graphite resistor tube unit of the type shown in the drawing, completely enclosed in a tight nickel shell. The gas was passed through the interior of the electrically heated resistor tubes in intimate contact with the walls thereof, which were maintained at a temperature of 1900° C. by the flow of 60-cycle electric current through the tube walls. The heat generation and the temperature of the titanium tetrachloride was controlled by adjusting the voltage drop across the tubes by means of a variable transformer. The hot titanium tetrachloride vapor discharged from the resistor unit was at a temperature of 1050° C. and in uncontaminated state, and was conducted from the heater at 8 p. s. i. g. for direct use in the preparation of pigment-grade titanium dioxide by the vapor phase oxidation of said titanium tetrachloride with an oxidizing gas by the procedures described in U. S. Patent 2,488,439.

Example II

A vaporized mixture of anhydrous titanium tetrachloride containing 1% by weight of aluminum trichloride, at 300° C., was passed at a rate of 64 pounds per hour into an electrically heated graphite resistor tube unit of the type shown in the drawing, said unit being completely enclosed in a nickel shell. The gases were passed conterminously through the interior of the electrically heated resistor tubes, the latter being maintained throughout the operation at a temperature of 1800° C. by causing 60-cycle electrical current to pass along the walls of the tubes. The resulting heated mixture of titanium tetrachloride and aluminum chloride vapor was at a temperature of 850° C. and was passed directly into an associated vapor phase co-oxidation unit for the production of high-grade pigmentary rutile titanium dioxide by commixing it with an oxygen-containing gas in an oxidation reactor in accordance with the methods set forth in U. S. Patent 2,559,638.

Example III

A vaporized mixture of anhydrous titanium tetrachloride vapor containing about 1% by weight of aluminum chloride and 1% by weight of chlorine at 400° C. was continuously charged at a rate of 59 pounds per hour for heating into an electrically heated amorphous carbon resistor tube unit of the type shown in the drawing, which unit was completely enclosed in a nickel shell. The gases were passed conterminously through the interior of the electrically heated graphite resistor tubes, which were maintained at a temperature of 1580° C. by means of the passage of a 60-cycle electrical current along the walls of the tubes. On discharge from the unit a heated mixture of titanium tetrachloride, aluminum trichloride, and chlorine vapor at a temperature of 860° C. was obtained and was passed directly and continuously into an associated vapor phase cooxidation reactor unit for producing high-grade rutile titanium dioxide pigment by reaction with an oxygen-containing gas in the manner described in U. S. Patent 2,559,638.

Example IV

A vaporous mixture of anhydrous titanium tetrachloride containing 1% by weight of aluminum trichloride and 1% by weight of chlorine at 190° C. was heated to 400° C. by passage, at a rate of 52 lbs. per hour, through an electrically heated resistor furnace of the type described in the drawing and in which the amorphous carbon resistor tubes were maintained at a temperature of about 1500° C. by use of alternating current, with the exiting gases being passed into a second, similarly constructed bank of resistor tubes made of graphite. The gas stream was heated to 1050° C. during its passage through the graphite resistor tubes the walls of which were maintained at a temperature of about 1500° C. In this example the complex vaporous mixture was heated in the lower temperature range to a point above which the vaporous mixture will not disintegrate graphite while in contact with heated amorphous carbon surfaces, and then was passed into a graphite furnace wherein it was heated to a temperature in excess of 950° C. The resulting heated gas was then passed directly into an associated vapor phase co-oxidation reactor unit for producing a high-grade rutile titanium chloride pigment by reaction with oxygen and in the manner described in U. S. Patent 2,559,638.

While described above as applied particularly to the heating of gaseous chlorine and TiCl4, the invention is applicable to the heating without decomposition or contamination of anhydrous halogen-containing vapors generally and especially those selected from the group comprising free halogens having an atomic number greater than nine, as for example chlorine, bromine and iodine, halides of hydrogen, as for example HCl, HBr, and HF, halides of metals and metalloid elements, such as NaBr, MgCl2, AlCl3, SI4, TiCl4, ZrCl4, FeCl3, ZrBr4, and SnCl2, and mixtures thereof, to temperatures within the range of above the vaporization temperature of the halogen or halide to about 2000° C. For individual gases and mixtures of gases the range limitation will be variant depending on the thermal decomposition temperature of said gas or mixture of gases to disproportionation products, non-volatile at the temperature prevailing.

Due to the high chemical affinity of carbon for oxygen, whether in the free or combined state, particularly at high temperatures, the process is not adaptable to vapor containing appreciable amounts of free oxygen or chemically combined oxygen. Usually oxygen or oxygen-containing compounds can be removed by ordinary methods of separation such as distillation or condensation. However, in some cases to insure complete absence of oxygen from the vapor, it is necessary to deoxygenate the vapor by passing it over a heated bed of finely divided or granular activated carbon in order to avoid undue corrosion of the graphite or carbon heating resistor tube or element, and resultant costly maintenance and shorter resistor unit life.

The carbon resistor elements can comprise elemental carbon in the allotropic form of amorphous carbon or graphite, or mixtures and combinations thereof, in dense form as required to obtain the desired electrical resistance or chemical characteristics. The resistor heating elements can be in the form of solid rods, plates, or tubes, and can be straight or bent to any desired shape, as for example, in the form of a U-bend bayonet type rod or tube. The flow of vaporized halide gas, or halide gas mixture, is preferably through the individual resistor tube or tubes, or it can be parallel to individual resistor tubes or rods, preferably closely adjacent to each other, or across a bank or banks of multiple tubes or rods, as determined by structural heat transfer or electrical resistance characteristics of the complete unit. The surface area of the carbon resistor heating elements is variable along with the current to obtain the required heating. Also, the carbon resistor heating elements can be electrically connected in series or in parallel as required by the characteristics of the available source of electricity and heating requirements. While high temperature difference between heating elements and average vapor temperature favors increased efficiency of heat transfer, it may be advantageous, in the case of halides thermally decomposable to non-volatile products, to maintain as low a temperature differential as possible.

The problem of corrosion of carbon resistor elements in contact with complex halogen containing gases is referred to in the table above. A complex mixture of titanium tetrachloride, aluminum chloride and chlorine can be heated from the boiling point of titanium tetrachloride or about 136° C. up to about 950° C. by contact with amorphous carbon resistors but this same mixture cannot be heated in contact with graphite resistors at a temperature below about 350° C. without intolerable graphite resistor corrosion occurring. These complex mixtures which have been found corrosive to graphite resistor elements have been found desirable in the production of the highest quality titanium dioxide pigment, and, accordingly, the step heating method of Example IV will provide an effective, commercial means for raising the temperature of such mixtures from about 136° C. to a temperature of the order of 1000° C., and specifically above 950° C. In the practical operation of the process, the complex gas is first passed through amorphous carbon resistor tubes which can be maintained at any suitable temperature up to about 1500° C. or higher, and the partially heated gas is then passed through a second resistor furnace made of graphite wherein it is heated from a temperature in the range of 400–500° C. to a temperature above 950° C. by contact with graphite, also heated electrically, to a temperature above 1100° C., e. g., 1500° C.

In the production of pigmentary TiO2 from titanium tetrachloride, as explained above, one usually preheats the titanium tetrachloride to a temperature within a 750° C.–1050° C. temperature range, and preferably within an 800° C.–1000° C. range. It is understood that the temperature selected will determine the nature of the pigment being produced and one cannot specify a definite temperature for use in the manufacture of all types and grades of pigment. In the making of certain pigments it has been found desirable to add minor amounts of the chlorides of other metals, e. g., aluminum chloride. A product containing 1% Al2O3 can be obtained by adding the corresponding amount of aluminum chloride to the titanium tetrachloride gas stream, and it is customary to use about 1% AlCl3 in making rutile titanium dioxide pigment in this manner. The use of amounts up to 2% Al2O3 by weight in the pigment is considered good commercial practice. The presence of free halogen, e. g., free chlorine, acts to suppress the tendency of metal chlorides to become subchlorides at high temperatures and also acts to modify the nature of the oxidation reaction in the making of pigments of selected properties. The preparation of vaporous titanium tetrachloride containing 1% aluminum chloride and 1% chlorine is referred to above, but it is understood that within commercial practice one might desire to add as much as 2% AlCl3 and up to 5% free chlorine.

The electrical heaters referred to herein are described as carbon resistor heaters. A particularly desirable form comprises tubular resistance heaters wherein the gases to be heated are passed through the tube. These tubes can be packed, if desired, with lumps or balls of carbon to improve the heat transfer to the gases on their passage through the tube. These balls or lumps are heated by radiation from the hot walls of the tube and assist in transferring heat to the gases due to better contact of the gases with the hot surfaces.

The electrical resistor heating units are maintained at a temperature in excess of the heated vapor outlet temperature, usually within the range of 1100–2400° C., e. g., 1500–2000° C. The selected temperature can be varied to obtain optimum heat input for the conditions of operation. Temperatures highly in excess of the heated vapor outlet temperature are to be avoided in the adaptation of the process to gases such as titanium tetraiodide, which have low temperatures of thermal disproportionation.

The process of heating highly corrosive and reactive anhydrous halogen or halide vapors to high temperatures is possible due to low vapor pressure of carbon which does not become appreciable until a temperature of 3500° C. is reached, and due to its chemical inactivity with respect to the halogen or halide-containing vapors, when the carbon or graphite is in the solid form.

Known metal or oxygen-containing resistor elements would not be satisfactory for use in this process, particularly above 600° C.

The invention is also utilizable for heating anhydrous halogen or halide gases wherever such a gas is required in a pure state at a high temperature. It is particularly useful when such a vapor is required as a reactant in a vapor phase reaction at pressures in the range of −5 to 15 pounds per square inch gage, although it is adaptable for use at any desired higher or lower pressures.

Silicon tetrachloride can be heated to about 2000° C. and used at that temperature as a reactant with air or pure oxygen for vapor phase formation of pure $SiO_2$ or SiO of controlled fine particle size. Titanium tetrachloride can be heated to a high temperature, say, 1800° C., and reacted directly with a vaporized reducing metal such as magnesium to make titanium metal in molten or solid form.

A primary advantage of the invention is that an anhydrous vapor of halogen or halogen-containing compounds and combinations thereof can be readily raised to temperatures higher than heretofore possible with known methods, while maintaining the vapor in an uncontaminated state. A further advantage resides in the compactness and stability of the physical equipment required, with no auxiliary features needed except the source and control mechanism for the electrical current.

I claim as my invention:

In the process for the manufacture of titanium dioxide pigment by vapor phase co-oxidation of titanium tetrachloride and aluminum trichloride in admixture with chlorine, the steps of heating without contaminating vaporized anhydrous titanium tetrachloride containing from about 1–2% by weight of anhydrous aluminum trichloride and up to 5% by weight of anhydrous chlorine within the range of 136° C. to 1000° C. by initially passing said vaporized mixture for heating to at least 350° C. conterminously past and in direct contact with an electrically heated solid, carbon tubular resistor consisting of amorphous carbon, and then passing said heated vapors for said contact through a second resistor furnace consisting of electrically heated solid graphite, and then into a reaction chamber for interaction with oxygen.

References Cited in the file of this patent

UNITED STATES PATENTS

| | | |
|---|---|---|
| 1,373,038 | Weber | Mar. 29, 1921 |
| 1,967,235 | Ferkel | July 24, 1934 |
| 1,981,015 | Williams | Nov. 20, 1934 |
| 2,347,496 | Muskat et al. | Apr. 25, 1944 |
| 2,367,118 | Heinen | Jan. 9, 1945 |
| 2,488,439 | Schaumann | Nov. 15, 1949 |
| 2,589,466 | Wilcox | Mar. 18, 1952 |

OTHER REFERENCES

Anhydrous Aluminum Chloride, Technical Paper 321, 1923 ed., by Oliver C. Ralston, pp. 18 and 19.

"A Course in General Chemistry" by McPherson and Henderson, 3d ed., page 457. Ginn and Co., N. Y.

"Titanium" by Jelks Barksdale, 1949 ed., pages 77, 81, 322. The Ronald Press Co., N. Y.

"Corrosion Handbook" by Herbert H. Uhlig, 1948 ed., pages 348–352. John Wiley and Sons, Inc., N. Y.